United States Patent [19]
Behnke

[11] Patent Number: 6,011,231
[45] Date of Patent: Jan. 4, 2000

[54] ELECTRODE WIRE RECOVERY SYSTEM FOR ELECTRIC DISCHARGE MACHINE

[76] Inventor: Michael J. Behnke, 1501 E. Sunset Ter., Arlington Hts., Ill. 60004

[21] Appl. No.: 09/031,255

[22] Filed: Feb. 26, 1998

[51] Int. Cl.[7] .................................... B23H 1/00
[52] U.S. Cl. .................. 219/69.12; 219/68; 219/69.1; 219/69.11; 219/69.17
[58] Field of Search .................. 219/69.12, 68, 219/69.1, 69.11, 69.17

[56] References Cited

U.S. PATENT DOCUMENTS

| | | | |
|---|---|---|---|
| 4,803,326 | 2/1989 | Kiyoshi | 219/69 W |
| 5,045,662 | 9/1991 | Yamada | 219/69.12 |
| 5,268,551 | 12/1993 | Kawanabe et al. | 219/69.12 |
| 5,506,381 | 4/1996 | Matsushima et al. | 219/69.12 |
| 5,556,551 | 9/1996 | Matsushima et al. | 219/69.12 |

*Primary Examiner*—Samuel M. Heinrich
*Assistant Examiner*—M. Alexandra Elve
*Attorney, Agent, or Firm*—Charles F. Lind

[57] ABSTRACT

The invention relates to an improved manner of recovering the used electrode wire discharged from an electric discharge machine (EDM). A more detailed object of this invention is to provide an efficient and effective system for electrode wire scrap collection, including cutting the electrode wire discharging from the EDM into many small separate pieces and collecting there pieces randomly but compactly packed in a removable container proximate the EDM.

9 Claims, 3 Drawing Sheets

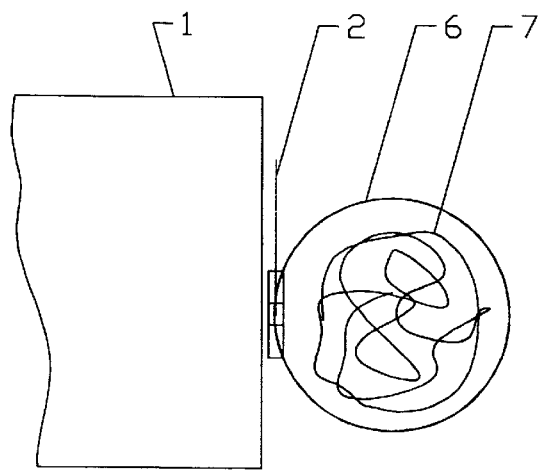
Fig. 1-t
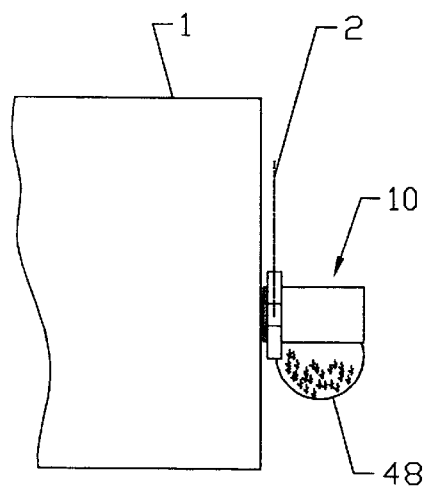
Fig. 2-t
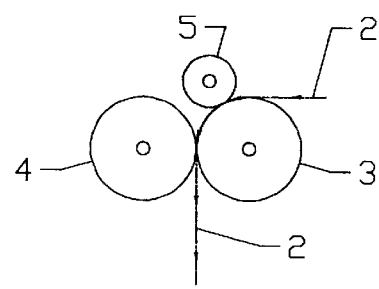
Fig. 1-e
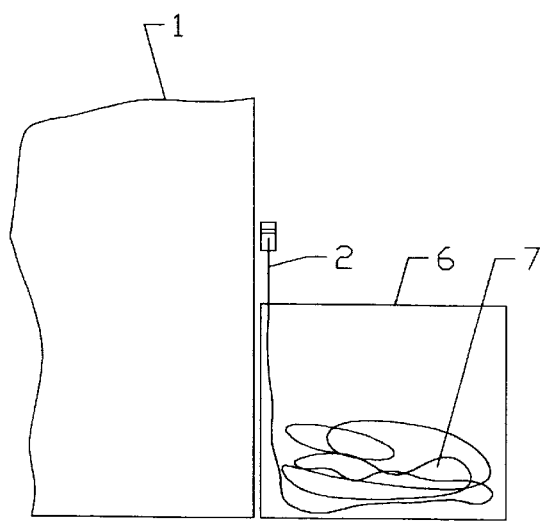
Fig. 1-s
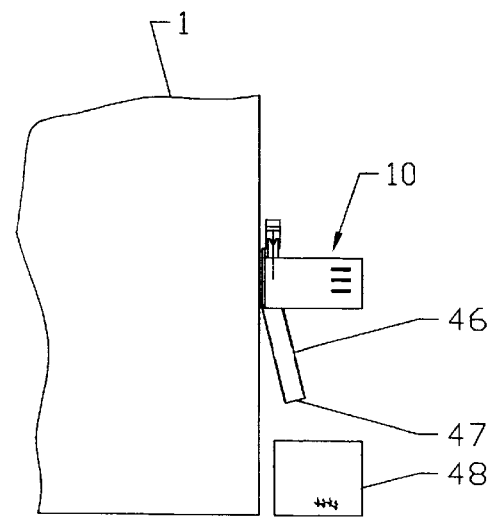
Fig. 2-s

ELECTRODE WIRE RECOVERY SYSTEM FOR ELECTRIC DISCHARGE MACHINE

BACKGROUND OF THE INVENTION

Electric discharge machines (EDM) can use a fine brass electrode wire for arcing electric current across a gap with a steel or other conductive metal workpiece, for cutting through the workpiece. The electrode wire is trained over rollers located on opposite sides of the workpiece so as to be stretched tight while being oriented transverse to the workpiece, and the wire and workpiece are moved relative to one another to trace out a cutting path through the workpiece while the rollers are powered to axially shift the wire during this cutting operation. The electrode wire is continuous, being unwound from a spool and feed through the EDM and past the workpiece, and then being discharged from the EDM while yet unitary with the spool wire. The discharged electrode wire is then collected in an underlying removable container, to be salvaged as scrap.

Most specifics of the EDM unit 1 are immaterial for the purpose of this invention, so that it is only schematically illustrated in FIGS. 1, 2 and 5, except for a few details. Thus, the used electrode wire 2 is illustrated as being discharged along a horizontal path until powered drive roller 3 and idler rollers 4, 5 (see FIGS. 1-e and 5) redirect it to a generally downward path, illustrated vertically (but certain other EDM units might instead discharge the used electrode wire downwardly and inclined at only a slight angle, possibly 15 degrees, from the horizontal). Most commonly nonetheless, the discharging electrode wire 2 is then pushed axially from between the rollers 3, 4 and allowed to fall under the influence of gravity vertically into the confines of an underlying large open top container 6, such as a 40 gallon fiber drum or garbage can. Typically there is no specific guide structures to influence how the wire piles up in the container.

As the axially advancing used electrode wire is fine (typically between 0.006" and 0.012" OD), it has little strength against axial compression and guide tubes or the like must be used if it is to be axially advanced along a specific path or it otherwise will bow or even kink laterally of itself. Once discharged for the EDM, without guide tubes, the axially advanced electrode wire 2 will randomly weave laterally around or back and forth to pile up on itself in the container 6, being laterally redirected and/or even kinked by the container side wall or the wire pile 7 itself. As a result, the wire pile 7 contained within the container is mostly made up of air gaps between crossed layers of the wire, and the wire pile tends to grow vertically quite rapidly so that frequent operator attention is needed to manually pack the wire pile down heightwise and/or to replace the filled container. Without these precautions, the discharged electrode wire can become entangled with nearby machine components including the rollers 3, 4, 5 that could lead to an EDM malfunction. Also, the very low wire weight/container volume ratio dictates the need for using large collection containers, and the need for similar floor space proximate the EDM and on any vehicle shipping the containers to the scrap dealer, to make the whole-wire mode of scrap collection most inefficient and ineffective.

SUMMARY OF THE INVENTION

This invention relates to and an object of this invention is to provide an improved manner of recovering the used electrode wire discharged from an electric discharge machines (EDM).

A more detailed object of this invention is to provide an efficient and effective system for electrode wire scrap collection, including cutting the electrode wire discharging from the EDM into many small separate pieces and collecting these pieces randomly but compactly packed in a removable container proximate the EDM, and achieving thereby a high wire weight/container volume ratio for reducing the container size and/or the need for frequent operator attention and container replacement.

A related object of this invention is to provide an electrode wire scrap collection system that utilizes wire cutting apparatus therein that can be easily and economically fabricated as an independent after-market accessory suited to be mounted onto existing EDM units where and as needed, or that can be incorporated directly into a new EDM by the manufacturer thereof.

BRIEF DESCRIPTION OF THE DRAWINGS

These and other objects, features or advantages of the invention will be more fully understood and appreciated after reviewing the following specification which includes as a part thereof the accompanying drawings, wherein:

FIGS. 1-t and 1-s respectively are top plan and side elevational views, represented in a very schematic format, and FIG. 1-e is an enlarged end elevational view of part of FIG. 1-s, of a typical electric discharge machine (EDM) and a commonly practiced whole-wire mode of collecting used electrode wire being discharged from the EDM;

FIGS. 2-t and 2-s respectively are similar top plan and side elevational views, illustrating the same EDM with the disclosed wire cutting apparatus thereon;

While the drawings illustrate both construction and probable association of the structural components, the relative scale might be exaggerated to better illustrate the invention.

DETAILED DESCRIPTION OF THE INVENTION

Figure 3:
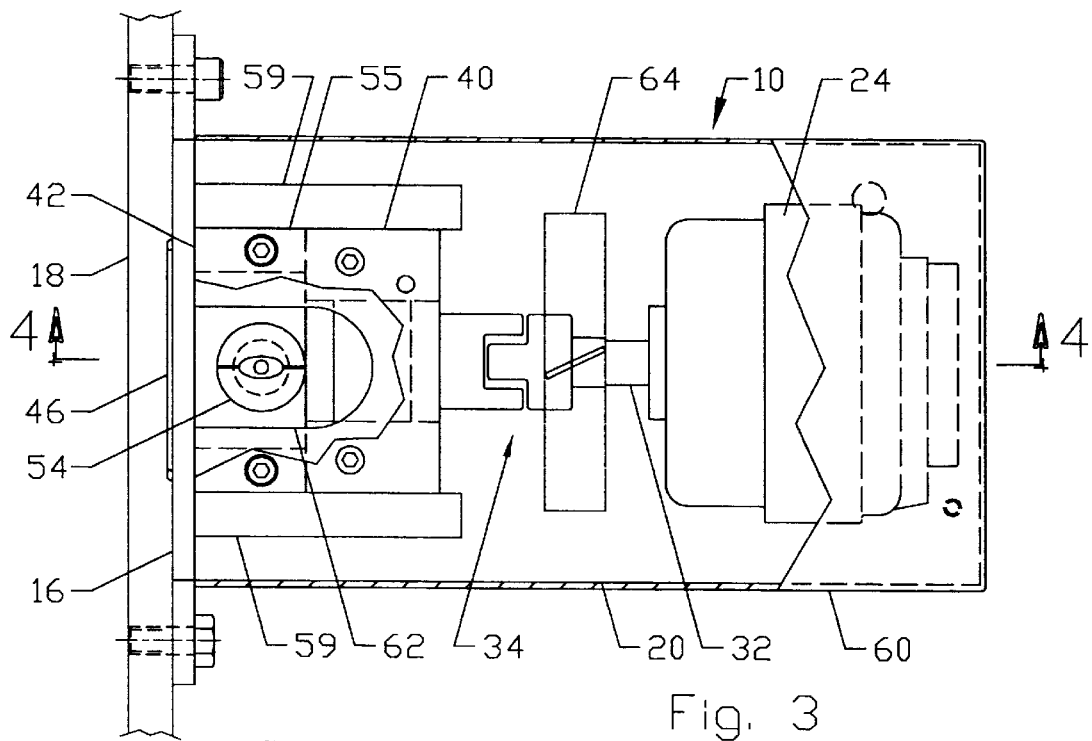
FIG. 3 is a top plan view of the wire cutting apparatus of FIGS. 2, except being illustrated at a larger scale and partly broken away for clarity of disclosure.
Figure 4:
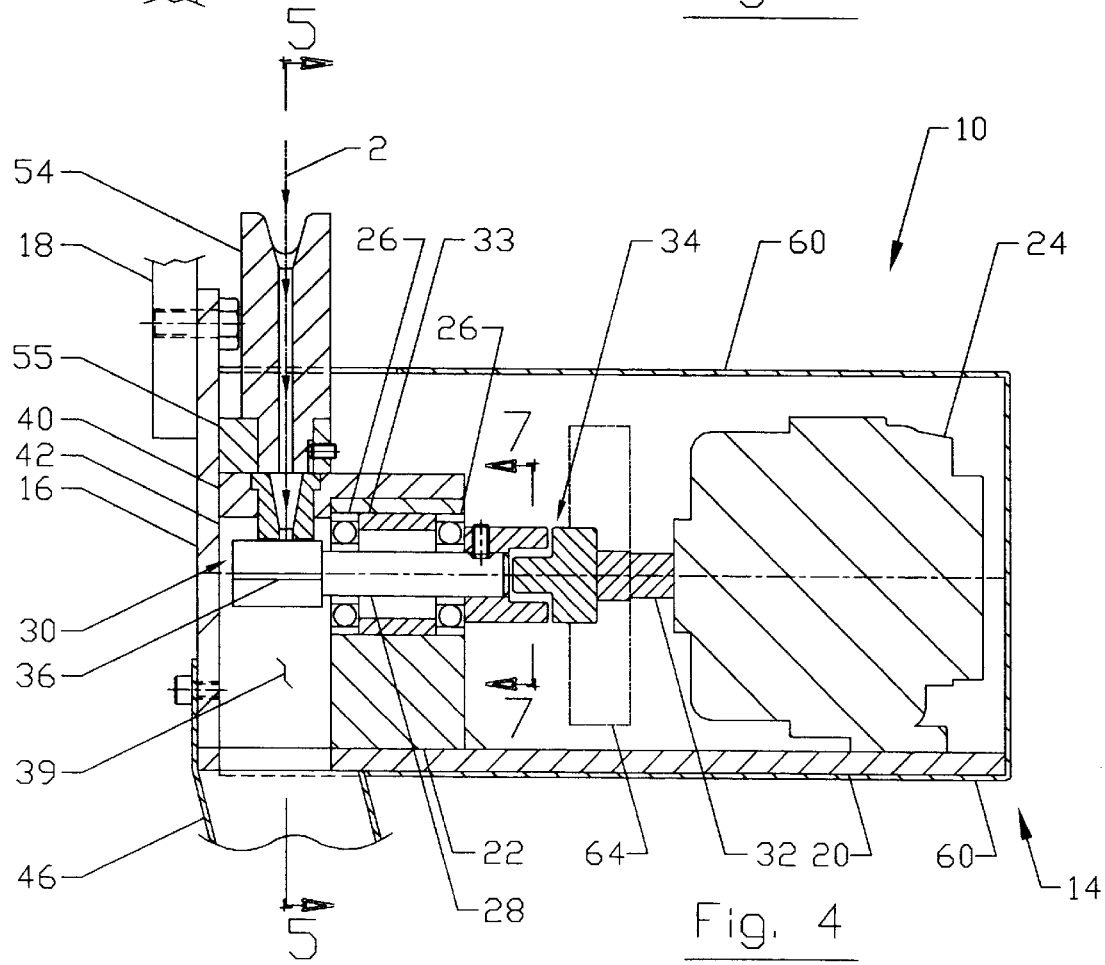
FIG. 4 is a sectional view taken from line 4—4 in FIG. 3.
Figure 5:
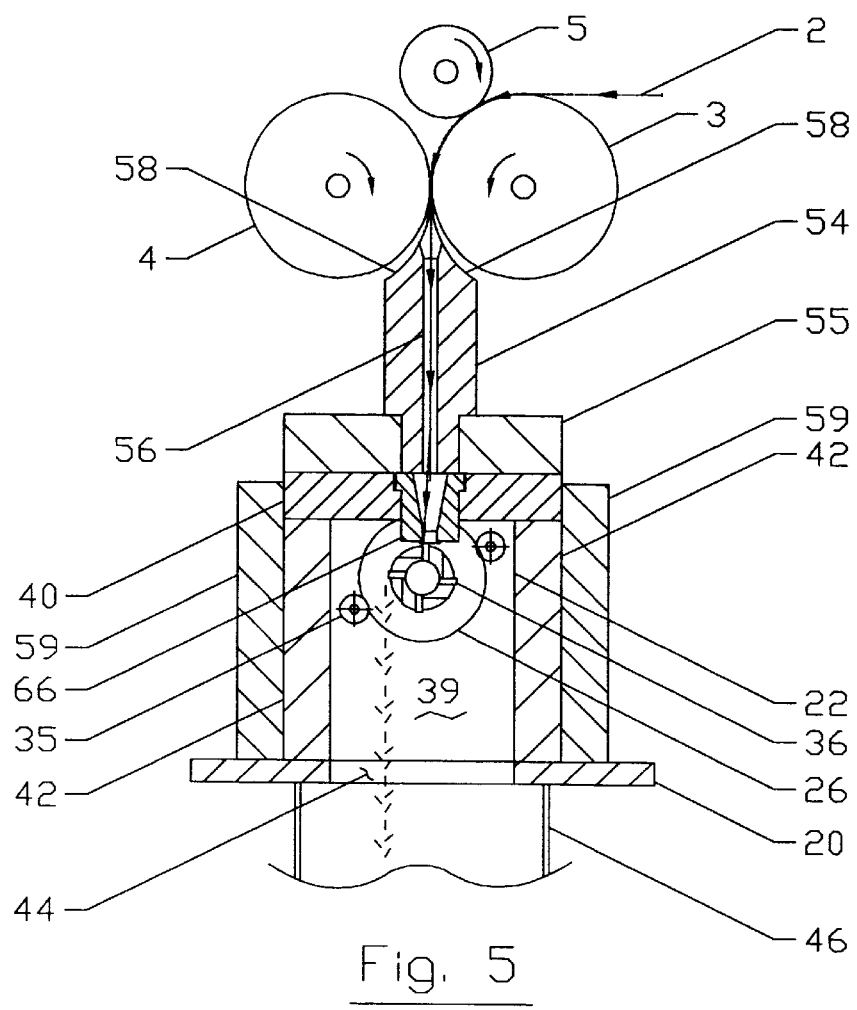
FIG. 5 is a sectional view taken from line 5—5 in FIG. 4, shown in operative association with the EDM components of FIG. 1-e.
Figure 6:
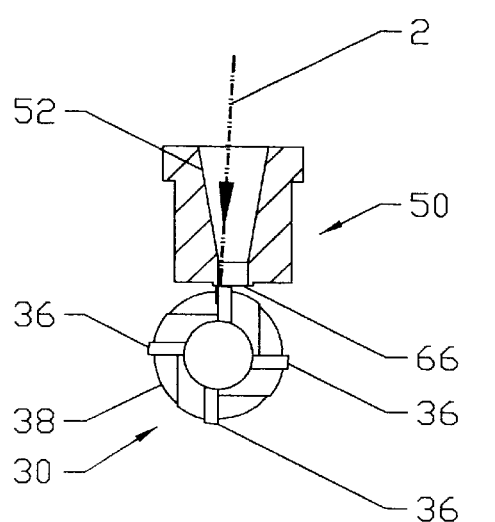
FIG. 6 is an enlarged sectional view of cutting apparatus components used in FIG. 5.
Figure 7:
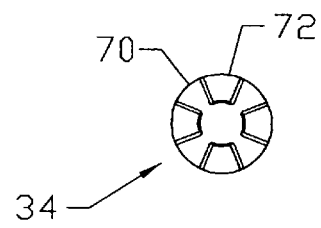
FIG. 7 is a sectional view taken from line 7—7 in FIG. 4.

The electric discharge machine (EDM) 1 illustrated in FIGS. 2, 5 has the used electrode wire 2 discharging through inventive cutting apparatus 10 mounted on the EDM, proximate the location of the discharging electrode wire. The apparatus 10 is illustrated in detail in FIGS. 3–7 and has a frame 14 with front plate 16 suited to be connected by bolts or the like to EDM wall 18. The frame 14 further has a base plate 20 supporting bearing block 22 and drive motor 24 in spaced proximity. Spaced bearings 26 in the bearing block 22 rotatably support the middle portion 28 of the elongated body of a conventional four flute end mill cutter 30. The cutter body further extends beyond the bearings to shaft end 29 which is axially aligned with shaft 32 of the drive motor 24, and the adjacent ends of the shafts 29, 32 are keyed to rotate in unison together by coupling 34. The bearings 26 are separated by spacer 33 and are held in the bearing block 22 against the coupling 34 and by the overlying heads 35 of bolts threaded into the bearing block.

The mill cutter 30 illustrated has four cutting edges 36 that radially project slightly beyond the otherwise cylindrical end 38 of the cutter. The cutting edges 36 are cantilevered away from the bearing block 22 and bearings 26, and are contained within enclosure 39 defined by front plate 16, bearing block 22, top plate 40 mounted off of the bearing block, and spaced side plates 42. An opening 44 in the base plate 20 communicates the frame enclosure 39 to a chute tube 46 that is connected by bolts or the like to the front plate 16 of frame 14. The chute tube 46 can be made to any selected desired length, suited to have its lower outlet end 47 overlie the top opening of collection container 48.

An annular guide 50 is mounted in the frame top plate 40, and has a conically converging throughbore 52 for receiving and guiding the used electrode wire 2 as it is axially pushed and advanced into the cutter enclosure 39. An infeed tube 54 is supported by frame block 55 and has a throughbore 56 that is aligned with the guide throughbore 52. The inlet end of the infeed tube 54 might be scalloped to define oppositely facing concave faces 58 suited to allow the tube to be fitted spaced from but closely adjacent the paired EDM wire discharging rollers 3, 4, for minimizing the unsupported axial gap between the wire-driving proximate tangent locations on the rollers and the tube throughbore and the chances that the discharging wire might buckle before becoming laterally supported within the infeed tube.

The bearing block 22, top plate 40, and spaced side plates 42 can be secured together to form a rigid unitary structure, and this structure can be fitted between and secured to triangular gussets 59 connected to the front and base walls 16, 20, operable to provide firm support between the moving cutter 30 and guide 50. A case 60 can be positioned over the operating components and secured to frame base plate 20, with the infeed tube 54 being extended through case opening 62. A fan 64 keyed to the motor shaft 32 might be used for drawing air through the case enclosure and over the motor for cooling.

Operation of the motor 24 will rotate the cutter 30 to have the cutter edges 36 move substantially parallel to guide end face 66 as they traverse the outlet of the guide throughbore 52. The guide throughbore at its outlet end will be only slightly larger than the electrode wire 2 to keep the wire extended in the direction sharply transverse to the guide end face 66, and the cutting edges 36 and the guide end face 66 will be located in close proximity (possibly with only a 0.001"–0.005" gap therebetween, such as a 0.0015" gap, compared to an electrode wire OD between possibly 0.006" and 0.012"). These configurations will minimize the possibility of the electrode wire 2 merely bending and becoming wedged between the cutter end 38 and guide face 66. Each cutting edge 36 will thus cut off any portion of the electrode wire in its way, thereby cutting a great multitude of separate wire pieces each typically between 0.001" and 0.15" in length, depending on the relative speeds of cutter rotation and axial advance of the electrode wire out of the guide face 66.

Of great importance, the many cut electrode wire pieces can merely fall from the lower enclosure outlet opening 44 and down the chute tube 46 to the underlying container 48; and being finely granular, can become compactly packed within the container. The weight of collected cut pieces might typically for example be between 75%–90% of the weight density of a solid block of the wire material of the same volume, which is highly efficient. Moreover, this collection capacity might be between 20–100 times more effective spacewise than scrap from the whole-wire collection system. Another benefit is that the scrap price of granular brass generally is significantly higher than that for whole brass wire, piled together, which typically will be highly discounted.

Other important aspects of the cutting apparatus include its simplicity of construction and its use of conventional structural components, including a conventional four flute end mill cutter mounted by bearings to cantilever the cutting edges away from both the bearings and the coupling. The cutter edges and wire guide can be made of carbide for durability of use. The coupling can be made with a small degree of rotatable "play" between the components respectively keyed to the different cutter and motor shafts 29, 32, as illustrated by the gaps between the drive lugs 70, 72 of the coupling components respective keyed to the different shafts. This allows the cutter 30 to have a "running start" as the motor 24 is initially turned on, operable to effectively avoid a motor stall should a wire-cutter bind exist before the motor is turned on.

As the cutting apparatus 10 is compact and self-contained, it can serve as an after market accessory suited to be added in the field to an existing EDM, where the apparatus frame 14 can be secured relative to the EDM in order to achieve the above described desired positional association and to easily convert the EDM to this improved used electrode wire collection system. If the existing EDM might discharge the electrode wire at the more horizontal inclination, as above noted, the entire apparatus frame 14 can be angled to have the infeed tube 54 line up with the discharging wire, whereby further then the enclosure outlet opening 44 to an appropriately aligned chute tube might be provided in a then lowermost bottom or side wall. The cutting cooperation betwen the wire guide and proximate cutter can be also incorporated in new EDMs as such might be made by original EDM equipment makers. The cutting apparatus design is more efficient and economical to use than any other related scrap handling system, or apparatus offered for EDM use, such as might require specialized and costly cutting components, and not a conventional mill cutter. The invention thus provides an effective and effieient used electrode wire scrap collection system and improves the overall reliability of the EDM operation, by reducing the needed scrap container size and floor space proximate the EDM for it, operating with consistent high weight density packing of the scrap wire in the container and reducing the need for frequent operator attention.

While the disclosed embodiment is preferred, other embodiments might be devised differing only in incidental details. The invention accordingly is to be limited only by the scope of the following claims.

What is claimed is:

1. Apparatus for collecting used continuous electrode wire being discharged axially from an electric discharge machine (EDM) between powered EDM rollers, comprising the combination of a guide having a throughbore and a cutting face angled transverse to the throughbore at one end thereof, the wire passing axially through and discharging from the throughbore adjacent and transverse to said guide cutting face;

a mill cutter having an elongated body with peripherial cutting edges at one end thereof and a mounting shaft axially between the cutting edges end and the other body end, and bearings supporting the mill cutter at the mounting shaft to rotate the cantilevered one end and the cutting edges thereon in close proximity of and past the guide cutting face;

a drive motor having an output shaft aligned with and adjacent the other end of the guide body, and coupling structure between the adjacent shafts operable to rotate them in unison;

frame structure surrounding with clearance the guide cutting face and cutter cutting edges and defining an enclosure with a lower opening, a chute tube communicate with the enclosure via said frame structure opening, and said chute tube having a lower outlet end opening remote from the enclosure, whereby a collection container can be positioned both in proximity of the EDM and underlying the outlet end opening of the chute tube; and whereby motor operation moves the cutter edges past the guide cutting face for effectively cutting the electrode wire in each's way, creating many separate wire pieces of variable short lengths that fall into and compactly settle in the collection container.

2. Apparatus for collecting used continuous electrode wire being discharged from an EDM according to claim 1, comprising an infeed tube connected to the guide and having a throughbore communicating with the guide throughbore at its inlet end thereof, said infeed tube remotely of the guide having oppositely facing angled faces suited to fit between and closely adjacent but spaced from the EDM rollers with the electrode wire being discharged into the infeed tube throughbore for minimizing an unsupported axial gap for the discharging wire to span between the powered EDM rollers and the tube throughbore.

3. Apparatus for collecting used continuous electrode wire being discharged from an EDM according to claim 1, comprising said coupling having components respectively keyed to the different cutter and motor shafts, the components each having interfitted lugs with clearance therebetween for yeilding some rotatable play between the cutter and motor shafts, suited to allow the cutter to have a running start as the motor is initially turned on, operable to overcome wire-cutter binds when the motor is turned on.

4. Apparatus for collecting used continuous electrode wire being discharged from an EDM according to claim 1, comprising said guide face and said cutter cutting edges being in close proximity separated by only a 0.001"–0.005" gap, compared to an electrode wire having possibly an 0.006"–0.012" outer diameter.

5. Apparatus for collecting used continuous electrode wire being discharged from an EDM according to claim 1, comprising the lengths of said separate wire pieces depending on the number of cutting edges on the cutter and the relative speeds of cutter rotation and axial advance of the discharging electrode wire, and such preferably yielding piece lengths between 0.001"–0.15".

6. Apparatus for collecting used continuous electrode wire being discharged from an EDM according to claim 1, comprising said frame structure having a base plate supporting said drive motor and bearing block for holding said bearings in spaced aligned proximity and for holding said guide and cutter in said association, and means connecting said frame structure to EDM structure suited to have said apparatus serve as an add-on accessory for existing EDMs.

7. Apparatus for collecting used continuous electrode wire being discharged from an EDM according to claim 1, comprising the guide face and said cutter cutting edges being in close proximity separated by only a 0.001"–0.005" gap, compared to an electrode wire having possibly an 0.006"–0.012" outer diameter, and the lengths of said separate wire pieces depending on the number of cutting edges on the cutter and the relative speeds of cutter rotation and axial advance of the discharging electrode wire, and such preferably yielding piece lengths between 0.001"–0.15".

8. Apparatus for collecting used continuous electrode wire being discharged from an EDM according to claim 7, comprising an infeed tube connected to the guide and having a throughbore communicating with the guide throughbore at its inlet end thereof, said infeed tube remotely of the guide having oppositely facing angled faces suited to fit between and closely adjacent but spaced from the EDM rollers with the electrode wire being discharged into the infeed tube throughbore for minimizing an unsupported axial gap for the discharging wire to span between the powered EDM rollers and the tube throughbore.

9. Apparatus for collecting used continuous electrode wire being discharged from an EDM according to claim 8, comprising said frame structure having a base plate supporting said drive motor and a bearing block for holding said bearings in spaced aligned proximity and for holding said guide and cutter in said association, and means connecting said frame structure to EDM structure suited to have said apparatus serve as an add-on accessory for existing EDMs.

* * * * *